United States Patent [19]

Alheritiere

[11] Patent Number: 4,474,136

[45] Date of Patent: Oct. 2, 1984

[54] DEVICE TO LAY DOWN A PLASTIC BEAD OR THE LIKE ONTO AN ESSENTIALLY PLANE SURFACE

[75] Inventor: Jean Alheritiere, Igny, France

[73] Assignee: Regie Nationale des Usines Renault, Boulogne-Billancourt, France

[21] Appl. No.: 464,696

[22] Filed: Feb. 7, 1983

[30] Foreign Application Priority Data

Feb. 9, 1982 [FR] France ............................. 82 02106

[51] Int. Cl.³ .............................................. B05C 3/02
[52] U.S. Cl. ..................................... 118/410; 118/71;
118/500; 118/DIG. 2
[58] Field of Search ................. 118/DIG. 2, 426, 410,
118/302, 71, 500, 407, 501, 502, 503; 269/55,
61, 289 MR, 318; 248/346, 116; 222/148;
141/90; 425/376 R; 264/176 R, 177 R;
308/DIG. 1

[56] References Cited

U.S. PATENT DOCUMENTS 3,608,884 9/1971 Humphreys ............................. 269/55
4,399,988 8/1983 De Shong .............................. 268/8

FOREIGN PATENT DOCUMENTS 851884 10/1952 Fed. Rep. of Germany .... 74/DIG. 4
1805131 10/1968 Fed. Rep. of Germany .
2936396 3/1981 Fed. Rep. of Germany .
2319430 7/1975 France .
2475941 2/1980 France .

Primary Examiner—Michael R. Lusignan
Assistant Examiner—K. E. Jaconetty
Attorney, Agent, or Firm—Oblon, Fisher, Spivak, McClelland & Maier

[57] ABSTRACT

A device for laying down a plastic bead on an essentially plane surface of a part consists of a table supporting a movable frame having a drive track. The drive track cooperates with a pinion rotatable about an axis fixed to table so as to drive the frame. The part is mounted on the frame. A slotted rod is fixed to the frame and cooperates with a roller mounted on the table for preventing the frame from rotating about itself. A gun for depositing the bead is positioned above the axis of the drive pinion. As the drive pinion rotates the frame, the gun will deposit a bead on the part mounted on the frame along a line corresponding to the contour of the drive track.

10 Claims, 4 Drawing Figures

DEVICE TO LAY DOWN A PLASTIC BEAD OR THE LIKE ONTO AN ESSENTIALLY PLANE SURFACE

BACKGROUND OF THE INVENTION

1. Field of the Invention

This invention relates to devices to lay down at least one plastic bead or the like onto an essentially plane surface of a part, particularly for the making of seals or seams to join another part.

2. Description of the Prior Art

Such devices are known in which pumps and guns are used which can extrude a plastic bead of a chosen diameter and at given speed which is in harmony with the relative movement between the gun and the part so as to lay down a uniform bead onto the part along a given trajectory.

In known devices, the gun is mounted onto a control system having two orthogonal axes (X and Y) whose motors respond to a programmed servo-control, or copy a model, while each part to be processed is fixed onto a fixing frame in a given position.

In certain devices, the movement of the gun along axes X and Y is accomplished by the shifting of cams specific to the work to be done, or by gauges and complex follower-rollers.

In the case of circular beads, the rotation of the part itself has already been proposed as a simpler and more advantageous technique than circular movement of the gun which, with its multiaxis shift control, requires a complex system that is heavy to manipulate, which is a drawback from the point of view of cost, place, weight, and rapidity of manipulation, making difficult a rapid pace of assembling a stream of parts to be processed.

SUMMARY OF THE INVENTION

This invention has as its object the provision of a device performing the aforementioned functions without the drawbacks mentioned above.

In particular, in order to lay down a plastic bead or the like onto an essentially plane surface of a part with a gun moving with respect to the part, the present invention provides a table onto which is mounted a movable frame whose function is to bear on its upper portion each part to be processed in a given position and which has on its lower portion a drive-track of a contour corresponding to that of the plastic bead to be laid down, this track having a magnetic attractive cooperation with a rotating-drive mechanism borne by the table and fixed in position aligned with the gun releasing the plastic bead or the like. The frame is prevented from revolving upon itself, so that the bead is essentially laid down along a line equivalent to that of the drive-track.

In particular, the track may be toothed and the rotative-drive mechanism may be a pinion, or the track and the drive mechanism may cooperate only by adherence.

The support of the frame onto the table may be by ball or air type bearing.

The guiding means may simply consist of an elongated bar having a slot into which is inserted a roller borne by the table, or may consist of an articulate system of a pantographic type, or of a double parallelogram aimed at imposing a shifting of the frame and part in parallel to one another.

The gun may simply be mounted on a mobile support-arm between a given position of work and a position of rest spaced from the frame, making the shifting of parts easy, and also defining a position at which the gun can be immersed into a mobile tumbler in order to prevent the bead compound from hardening in case the machine stops for a certain time.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
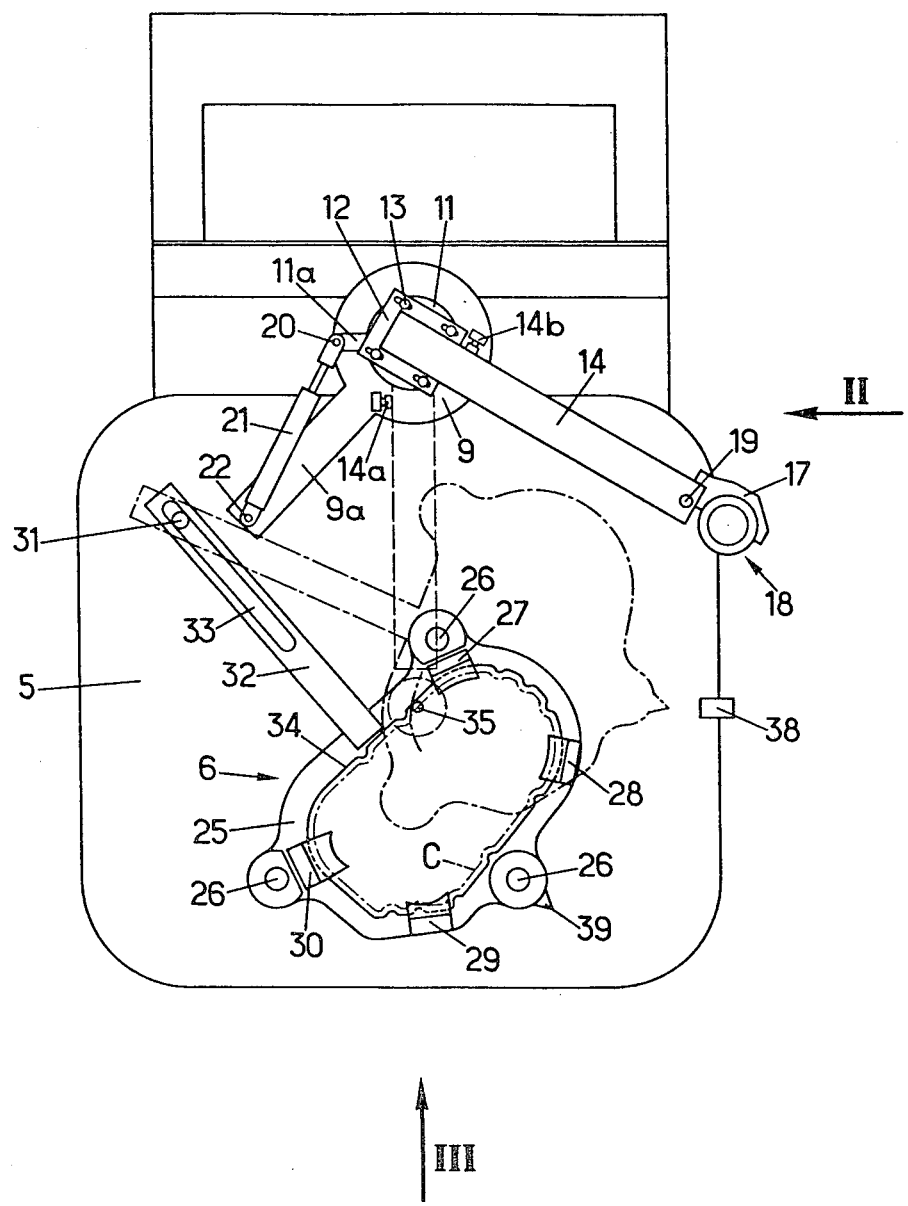
FIG. 1 is a plan view of the device.

The device shown includes a base 1 onto which is vertically welded a tube 2 maintained by gussets 3, and whose upper-part bears, supported by two gussets 4, a table 5 onto which is mounted a shifting frame 6.

In the upper end of tube 2 is mounted a cylinder 8 which is slidably adjustable in height with screw 7. At the upper end of this cylinder 8 is welded a plate 9 having a radial arm 9a. In the upper end of cylinder 8 is mounted a stud 10 topped by a plate 11 rotatably fixed thereto. Onto plate 11 is adjustably mounted a radial arm 14 extending over table 5. This arm 14 has a base 12 having four holes for fixing screws 13 and, at its free end, two spring steel blades 15 and 16 forming an elastic parallelogram bearing a half collar 17 that supports gun 18 for releasing the plastic bead. This elastic parallelogram suspension is aimed at making it possible to adjust the gun in height with an adjusting screw 19 resting on arm 14.

Plate 11 has a radial arm 11a at the end 20 of which is articulated the end of the piston-rod of a jack 21 whose cylinder is also articulated, at 22, to the end of radial arm 9a of fixed plate 9. This jack 21 thus makes it possible to have arm 14, bearing gun 18, go from its rest position shown in solid line in FIG. 1 to its work position shown in dotted lines in FIG. 1.

Figure 2:
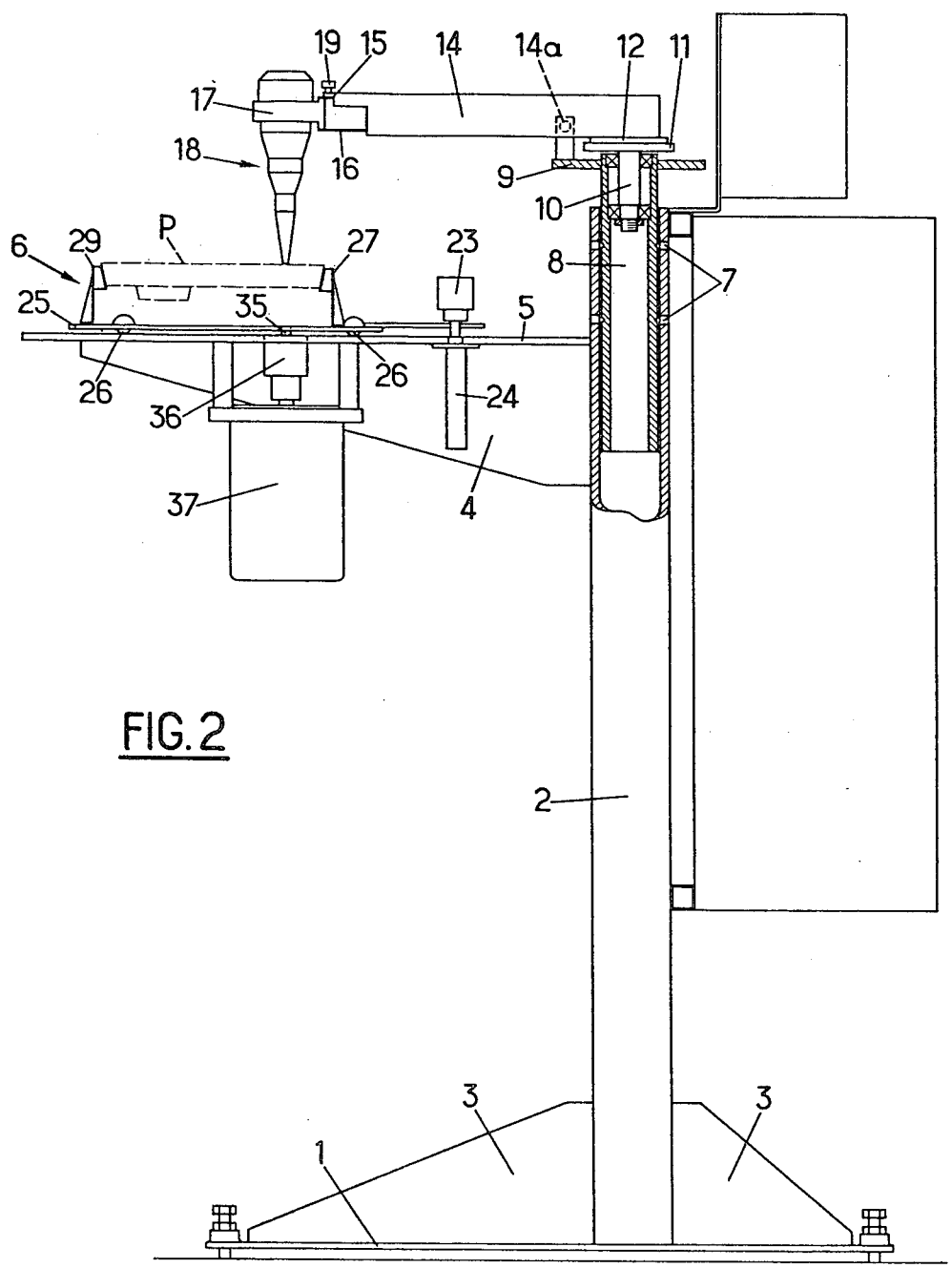
FIG. 2 is a side-elevation view of the device seen along arrow II of FIG. 1.
Figure 3:
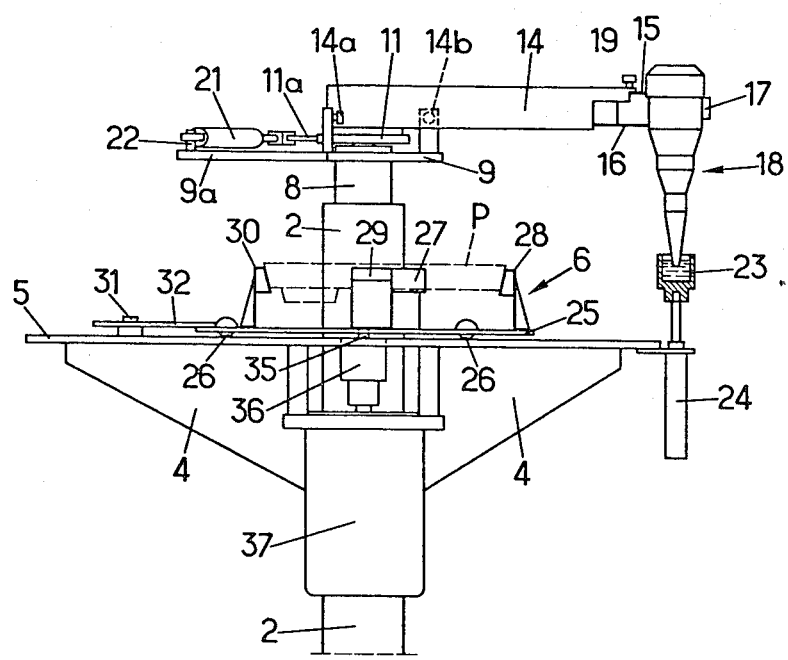
FIG. 3 is a partial elevation view of one side of the device seen along arrow III of FIG. 1.
Figure 4:
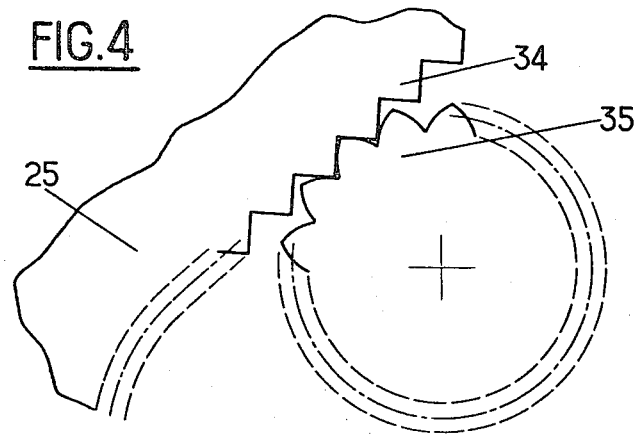
FIG. 4 is a detailed view of the frame drive.

At rest, the gun is at the base of a tumbler 23 borne by the piston-rod of a jack 24 whose cylinder is fixed vertically at the edge of table 5. This tumbler 23 can thus take, as shown in FIG. 2, a low position at a lower level than the nose of the gun, and a high position, as shown in FIG. 3, to which it can move to immerse the nose of the gun into oil contained in this tumbler when the gun must remain at rest for an extended time period.

Frame 6 includes a sole plate 25 having three ball-bases 26 enabling it to slide on table 5. This frame includes stands to bear the part P to be processed, four stands here, shown at 27, 28, 29, and 30. These stands are adapted to provide part positioning and to immobilize the part relative thereto, but they might also, to that effect, include lateral tightening mechanisms. The frame is prevented from rotating about itself and its shifting possibilities are thus reduced to sliding and pivoting with respect to a roller axis 31 fixed to table 5. The axis 31 is inserted in an elongated slot 33 of bar 32 which is integral with sole plate 25 of the frame. Frame 6 has the inside edge of its sole plate 25 cut into a drive-track having a contour corresponding to that of the plastic bead to be laid down, and which consists here of a toothed-track 34. Sole plate 25 is permeable to magnetic flux and track 34 is positioned to cooperate through magnetic attraction with a revolving pinion 35 mounted in fixed position onto table 5 over a magnet 36 itself driven by the output shaft of a motor 37, whose gear-case is fixed under table 4.

One will thus understand that when gun 18 is brought vertically over pinion 35 and the drive track 34 is put into engagement with pinion 35, the latter will make the frame move in accordance with the said track whose closed contour will follow the contacting pinion, so that every revolution of the frame and plastic bead is laid down by the gun onto part P along a contour corresponding to that of drive-track 34. Assuming gun 18 has the same axis as pinion 35, this contour is then defined as that of the toothed-track 34, but shifted inside the part by a distance equivalent to the radius of pinion 35.

A plastic bead deposition cycle will therefore correspond to one drive-track 34 lap of the frame via pinion 35. The initial position at the beginning of the cycle may be determined with a mark, such as proximity contact 38 which cooperates with an index 39 of sole plate 25 of the frame at a position of the latter, partially shown in dotted line in FIG. 1. With gun 18 in a work position, two consecutive signals of proximity contact 38 can be used to determine the cycle of release of the plastic bead along the desired contour. Jack 21 may be activated to enable the arm to shift aside into the position shown in FIG. 1 at the end of each cycle, thus making it easier to remove the part having just been processed and to replace it with the next one to be processed. There is shown here an assumed contour (C) of the plastic bead such as it would be laid down onto a part P at the end of a cycle in the case of a drive-track 34 whose contour is identical to the contour of part P itself.

Of course other alternatives such as those already mentioned may be used while remaining within the limits of the invention. The man skilled in the art will appreciate the reduced cost and space taken by such a device, considering the functions it is able to fulfill. The frame supporting the part makes the structure of the device and handling of the parts easier. The gun and its angular-shifting arm form a light weight mechanism with little inertia that can be shifted safely at each cycle. On one arm, more than one gun may be used, e.g. two, when two beads of distinct contour are to be laid down on the same part or possibly two different parts. The cycle limits need not depend on the use of a mark and proximity contact but may, for example, correspond to a predetermined number of turns of drive-pinion 35 detected by the use of a counter, or a continuous current motor with a coder.

What is claimed as new and desired to be secured by Letters Patent of the United States is:

1. A device to lay down a plastic bead on a plane surface of a part, comprising:
   a fixed support table;
   a frame movable on said table and including means for supporting said part, said frame including a portion having a drive track with a predetermined contour;
   rotating drive means mounted to said table about a fixed axis, said drive means including means for magnetically attracting said drive track whereby said drive track and drive means are in engagement with one another;
   a bead discharge gun positionable over said fixed axis; and
   guide means for preventing said frame from rotating about an axis passing through said frame, whereby rotation of said drive means causes a bead to be laid down along a line corresponding to said drive track contour.

2. The device of claim 1 wherein said drive-track and said rotating drive means cooperate by adhesion.

3. The device of claim 1 wherein said drive track is toothed and said drive means is a pinion.

4. The device of claim 1 wherein said frame is supported on said table by ball bearing means.

5. The device of claim 1 wherein said frame is supported on said table by air bearing means.

6. The device of claim 1 wherein said guide means comprise:
   a roller secured to said table about a fixed axis spaced from said frame; and
   an elongated bar fixed to said frame, said bar including an elongated slot housing said roller.

7. The device of claim 1 wherein said guide means comprise a pantographic type of articulated system.

8. The device of claim 1 wherein said guide means comprise a double parallelogram system providing parallel movements for said frame and said part.

9. The device of claim 1 wherein said gun includes means for moving said gun from said position over said fixed axis to a rest position.

10. The device of claim 9 including a tumbler containing a liquid, said tumbler being movable to a position wherein a discharge portion of said gun is immersed in said liquid when said gun is in said rest position.

* * * * *